United States Patent [19]

Grant et al.

[11] Patent Number: 4,967,290
[45] Date of Patent: Oct. 30, 1990

[54] MULTIPLE CHANNEL ROTARY MAGNETIC HEAD SCANNER HAVING STACKABLE ELECTRO-OPTICAL SIGNAL TRANSMISSION MODULES

[75] Inventors: Frederic F. Grant, Bellflower; John Grant, Downey, both of Calif.

[73] Assignee: Datatape Incorporated

[21] Appl. No.: 236,866

[22] Filed: Aug. 26, 1988

[51] Int. Cl.$^5$ .......................... G11B 15/14; G02B 6/26
[52] U.S. Cl. ..................................... 360/64; 350/96.15
[58] Field of Search ............... 360/64; 350/96.15, 96.2

[56] References Cited

U.S. PATENT DOCUMENTS

| | | | |
|---|---|---|---|
| 4,109,998 | 8/1978 | Iverson | 350/23 |
| 4,258,976 | 3/1981 | Scott et al. | 350/96.20 |
| 4,278,323 | 7/1981 | Waldman | 350/96.20 |
| 4,401,360 | 8/1983 | Streckmann et al. | 350/96.15 |
| 4,444,459 | 4/1984 | Woodwell | 350/96.15 |
| 4,447,114 | 5/1984 | Koeme | 350/96.2 |
| 4,511,934 | 4/1985 | Ohira et al. | 360/55 |
| 4,519,670 | 5/1985 | Spinner et al. | 350/96.15 |

FOREIGN PATENT DOCUMENTS 53-21912 2/1978 Japan .

*Primary Examiner*—Vincent P. Canney

[57] ABSTRACT

An electro-optical signal transmission module for transmitting an information signal between stationary and moving objects (such as the stationary and moving components of a rotary magnetic head scanner). The module has complementary mating structure to facilitate the stacking of a plurality of modules together, so that a plurality of separate information signals may be transmitted between relatively moving bodies.

7 Claims, 3 Drawing Sheets

MULTIPLE CHANNEL ROTARY MAGNETIC HEAD SCANNER HAVING STACKABLE ELECTRO-OPTICAL SIGNAL TRANSMISSION MODULES

BACKGROUND OF THE INVENTION

This invention relates in general to helical scan magnetic tape recording/reproducing apparatus. More particularly, this invention relates to helical scan magnetic tape recording/reproducing apparatus which includes a multiple channel rotary head scanner having a plurality of stackable electro-optical signal transmission modules for optically transmitting signals to and from the rotating multi-head scanner.

Advanced magnetic tape recording and reproducing systems require ever higher data transfer rates and increased bandwidths. In helical scan magnetic tape recorders using rotary head scanners, there must be some means for transmitting signals between the rapidly rotating head wheels upon which the recording and reproducing heads are mounted and stationary signal processing circuitry. Typically, rotary transformers are used to transmit both the record and reproduce signals from and to the magnetic heads carried by the rotating head wheel. Rotary transformers, however, have a predicted upper frequency limit of approximately 150 megahertz. Moreover, at such high signal frequencies, dimensional tolerances between the stationary and rotary coils of the rotary transformer are severe and cross talk between adjacent rotary transformers is difficult to eliminate.

In order to mitigate the disadvantages of rotary transformers, several proposals have been made to optically transmit signals between the stationary and rotating structure of a rotary head scanner. Optical transmission has an upper frequency limit of six gigahertz at the present time, with an unknown limit in the future. Moreover, crosstalk between record and reproduce signals and crosstalk between adjacent channels is virtually eliminated and dimensional tolerances are less severe. Where only one or two signals (for example, record and reproduce signals) are to be optically transmitted between the rotating and stationary structure of a rotary head scanner, the simplest technique is to have the optical signal transmission axis coincide with the axis of rotation of the head wheel or to have, at least either the optical signal transmitter or receiver coincident with the axis of rotation of the rotating head wheel. Such a technique is disclosed, for example, in Japanese Kokai Pat. No. 53-21912, published Feb. 28, 1978, Inventors, Koshimoto et al.; in Inventors Streckmann et al. U.S. Pat. No. 4,401,360, issued Aug. 30, 1983; and in Inventors Ohira et al. U.S. Pat. No. 4,511,934, issued Apr. 16, 1985. The arrangements disclosed in these patents are generally not easily adaptable to the transmission of multiple optical signals over separate optical paths. In order to minimize interference between the signals, either a half mirror or filter is used to separate two optical signals transmitted over the same optical axis which coincides with the axis of rotation of the head wheel.

Although multiplexing techniques (for example, time division multiplexing, frequency division multiplexing or wavelength division multiplexing) may be used to optically transmit multiple signals along the same optical axis, the circuitry required to multiplex and demultiplex such signals is complex and costly and susceptible to crosstalk and signal degradation. Thus, it is desirable to optically transmit each signal along a separate optical path in order to minimize such difficulties. Several techniques have been proposed for providing optical transmission between a first array of optical elements mounted on a rotating body and a second complementary array of optical elements mounted on a stationary or rotating body. Thus, in Inventor Koeme U.S. Pat. No. 4,447,114, issued May 8, 1984, there is disclosed an optical coupling body which is disposed between first and second arrays of optical conductors mounted for rotation at equal but opposite rates relative to the optical coupling body. Either light reflective or light transmissive means is arranged in the body to effect constant coupling of individual conductors in the first array with respective conductors in the second array. A similar technique is disclosed in Inventor Iverson U.S. Pat. No. 4,109,998, issued Aug. 29, 1978, and Inventors Scott et al. U.S. Pat. No. 4,258,976 issued Mar. 31, 1981. As disclosed, a derotation assembly is located between a stationary body and a rotating body having respective complementary arrays of optical transmitting and optical receiving elements. The derotation plate is rotated at half the speed of the rotating body. The optical transmission arrangements of the latter three patents are disadvantageous because of mechanical and electrical complexity, cost, and unreliability.

Inventors Spinner et al., U.S. Pat. No. 4,519,670, issued May 28, 1985, discloses a light rotation coupling for the transmission of a plurality of light channels between two parts which rotate relative to each other. A plurality of radially arrayed light transmitters rotate about an axis which coincides with the optical axis of a multiple refractive or reflective light transmitting optical assembly. A plurality of light receivers are axially arrayed along the optical/rotation axis. This technique is disadvantageous because of the use of complex and expensive optical transmission assemblies.

In another proposed optical signal transmission technique, individual optical slip rings are stacked along the axis of rotation of a moving body. Thus, Inventor Waldman, U.S. Pat. No. 4,278,323, issued July 14, 1981, discloses an optical signal transmission system which includes a plurality of axially spaced optical fiber rings rotatably mounted on a spindle. The rings are mounted in a fixed casing having a number of separate chambers corresponding to the number of optical fiber rings. Fixed fiber optic blocks surround each fiber optic ring. Complementary LEDs and photodiodes are respectively embedded in each optic fiber ring and block to effect optical signal transmission between the stationary optic fiber block and the rotating optical fiber ring. In Inventor Woodwell, U.S. Pat. No. 4,444,459, issued Apr. 24, 1984, a fiber optic slip ring comprises a toroidal optic wave guide which is uncoated along a circumferential window extending along the inner or outer circumference of the wave guide. An electronic device for transmitting an optical signal is connected to one end of the wave guide. A ring of radiation is produced so that an optical signal receiver may be positioned at any location around the circumference of the wave guide to receive the transmitted optical signal. As disclosed in the latter patent, a plurality of slip rings may be arrayed along the rotational axis of the receiver in order to effect transmission of a plurality of separate optical signals. The optical slip ring systems of the latter two patents are disadvantageous because of the inefficiency in producing a 360° ring of radiation.

SUMMARY OF THE INVENTION

According to the present invention, there is provided apparatus for transmitting multiple, separate optical signals between moving and stationary bodies which obviates the disadvantages of the prior art. According to an aspect of the present invention, a rotating body, such as a multihead head wheel of a rotary magnetic head scanner, is provided with a plurality of axially stacked electro-optical signal transmission modules. Each module transmits and receives an optical signal from a stationary optical signal emitting device mounted radially with respect to the axis of rotation of said head wheel.

According to another aspect of the present invention, each electro-optical signal transmission module comprises a generally cylindrical body having a light transmissive cylindrical wall and upper and lower circular walls. The upper and lower walls are provided with complementary mating means for facilitating the stacking together of a plurality of modules on a rotating body (such as a rotating magnetic head wheel). The central axis of the modules coincides with the axis of rotation of the rotating body. A radiation sensitive receiving device is centrally mounted on one wall of the module, while disposed on the opposite wall is an inwardly directed conically shaped reflective surface having a surface of revolution about the central axis of the module. An optical signal emitting device is mounted on the stationary body adjacent to the rotating module. An optical signal is transmitted through the radiation transparent cylindrical wall of the module where it is reflected off the conical reflective surface onto the radiation sensitive receiver.

According to an aspect of the invention, each electro-optical module has a sector shaped slot which extends axially between the upper and lower walls to permit routing of the signal carrying, electrical conductors of radiation receiving devices to the magnetic heads on the head wheel.

BRIEF DESCRIPTION OF THE DRAWINGS

In the detailed description of a preferred embodiment of the invention presented below, reference is made to the accompanying drawings in which like elements are numbered with like numbers.

DETAILED DESCRIPTION OF THE PREFERRED EMBODIMENT

In the following description of a preferred embodiment of the present invention, a specific application is described relating to rotary head scanners in helical scan magnetic tape recording/reproducing apparatus. It will be understood, however, that the present invention may be used in any application where multiple optical signals are to be transmitted between a rotating body and a stationary body. Other such applications include, for example, transmission of optical signals between rotating antennas and stationary signal processing equipment.

Figure 1:
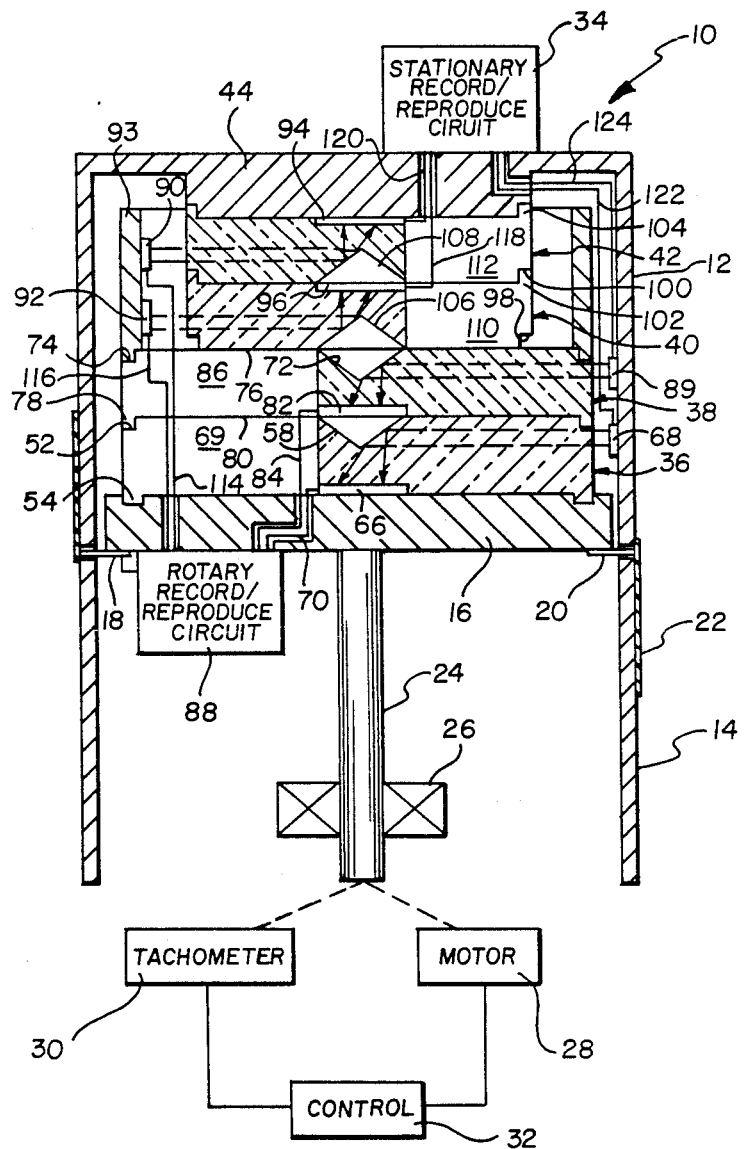
FIG. 1 is a partially sectional elevational view of a rotary head scanner incorporating the present invention.

Referring now to FIG. 1, there is shown a rotary magnetic head scanner incorporating an embodiment of the electro-optical signal transmission module of the present invention. As shown, rotary head scanner 10 includes upper and lower stationary drums 12 and 14 and a rotating head wheel 16 upon which are mounted a plurality of magnetic heads, such as, heads 18 and 20. Scanner 20 is mounted in a helical scan magnetic tape recording/reproducing apparatus in which a magnetic tape 22 is transported between supply and take-up reels (not shown) past scanner 10. Tape 22 is wrapped around scanner 10 in a helical path, so that, as head wheel 16 rotates, record/reproduce heads 18 and 20, record to and reproduce from slant tracks on tape 22. Head wheel 16 is rotatably mounted on shaft 24 which is supported in bearings 26. Shaft 24 is rotated by motor 28. A tachometer 30, linked to shaft 24, provides speed and phase control signals to control circuit 32 to control the rotational speed and phase of motor 28.

According to the present invention, record and reproduce signals are transmitted between rotary heads 18 and 20 and stationary record/reproduce circuit 34 by means of a plurality of electro-optical signal transmission modules, such as modules 36 and 38, 40 and 42. Modules 36, 38 are mounted for rotation on head wheel 16, and modules 40 and 42, are stationarily mounted on member 44 of drum 12. Electro-optical signal transmission modules 36–42 are capable of transmitting far greater bandwidth and higher frequency signals between the stationary and rotating members of scanner 10, than is possible with conventional rotary signal transformers. Thus, whereas the upper frequency of a rotary transformer is limited to less than 200 megahertz, optical signals may be transmitted in the gigahertz range. Optical signal transmission provides excellent signal-to-noise ratio; minimizes signal degradation during transmission; and eliminates electromagnetic and radio frequency interference from external and internal sources. Moreover, by providing a separate electro-optical signal transmission module for each record and reproduce signal channel, crosstalk between channels is virtually eliminated. The electro-optical signal transmission module of the invention is simple in design and construction and may be manufactured at low cost by well known mass production manufacturing techniques. As will be apparent from the following description, any number of modules may be easily stacked together thereby substantially increasing the bandwidth of a signal to be recorded/reproduced. In addition, the optical transmission modules of the present invention have less severe dimensional tolerances than rotary transformers.

As shown in greater details in FIGS. 2–5, electro-optical signal transmission module 36 comprises a generally cylindrical body of optically transmissive material such as glass or plastic. Module 36 has generally circular upper and lower walls 46 and 48, respectively, and cylindrical light (radiation) transmissive wall 50. Walls 46 and 48 have respective, complementary, annular recess 52 and annular ridge 54 which are dimensioned to mate with complementary recesses and ridges on other modules which can be stacked together to provide a multiple signal transmission capability.

Upper wall 46 has a centrally located conically-shaped recess 58, the apex 60 (FIG. 5) of which is coincident with the central axis 62 of module 36. Recess 58 is coated with optically reflective material. Wall 48 has a centrally located recess 64 provided with a radiation sensitive receiving device 66, such as a photodiode or the like. Device 66 is symmetrically located with respect to axis 62. According to the invention, a radiation emitting device 68 (such as a light emitting diode or laser diode) is located radially with respect to conical reflective surface 58. As module 36 rotates, radiation from device 68 passes through the light transmissive material of module 36 and is reflected from conical surface 58 onto radiation sensitive device 66.

According to another aspect of the present invention, module 36 has a sector-shaped slot 69 which routes electrical conductors (such as 70) of radiation sensitive device 66. When a plurality of transmission modules are stacked together, the slots of the modules are aligned so that the electrical conductors from their respective radiation sensitive devices may be easily routed to the magnetic heads on head wheel 16.

Referring once again to FIG. 1, module 38 is shown to be of identical construction as module 36 and includes mirrored conical surface 72, annular recess 74 on upper wall 76 and annular ridge 78 on lower wall 80. A radiation sensitive device 82 is recessed in wall 80 and has a conductor 84 which is routed through slot 86 in module 38 and slot 69 in module 36 to rotary record/reproduce circuit 88 on head wheel 16. Slots 86 and 69 of modules 38 and 36 are aligned to facilitate routing of conductors 84 and 70 of devices 82 and 66. A radiation emitting device 89 is mounted on stationary drum 12.

Reproduce signals from heads 18 and 20 are transmitted optically from rotating head wheel 16 to stationary record/reproduce circuit 34 on stationary drum 12. These signals are transmitted by means of radiation emitting devices 90 and 92 (mounted on member 93 of head wheel 16) and optical signal transmission modules 40 and 42 having radiation sensitive devices 94 and 96. Modules 40 and 42 are of similar construction to modules 36 and 38 except they are of smaller diameter. Modules 40 and 42 have respective annular recesses 98 and 100; annular ridges 102, 104; reflective conical surfaces 106, 108; and aligned slots 110, 112.

Radiation emitting devices 90 and 92 have respective electrical conductors 114, 116 which are routed through slots 86 and 69 of respective modules 38 and 36 to circuit 88 on head wheel 16.

The operation of the rotary magnetic head scanner of FIG. 1 is as follows: information signals to be recorded by magnetic heads 18 and 20 on tape 22 are sent from circuit 34, by way of electrical conductors 122 and 124, to radiation emitting devices 68 and 88 mounted on stationary drum 12. Devices 68 and 88 emit optical signals which are transmitted through modules 38 and 36 and reflected from conical reflective surfaces 72 and 58 to radiation sensitive devices 82 and 66. Devices 82 and 66 convert the optical signals to electrical signals which are sent over electrical conductors 84 and 70 to circuit 88 and thence to heads 18 and 20. The signals are recorded on magnetic tape 22 as tape 22 is transported in a helical path past rotating heads 18, 20.

When scanner 10 is operating in a reproduce mode, heads 18 and 20 reproduce electrical signals from magnetic tracks recorded on magnetic tape 22. The reproduced electrical signals are sent via conductors 114 and 116 to radiation emitting devices 90 and 92 which are mounted on rotating head wheel 16. Devices 90 and 92 produce optical signals which are optically transmitted through modules 42 and 40 and reflected off reflective conical surfaces 108 and 106 to radiation sensitive devices 94 and 96. Devices 94 and 96 convert the optical signals into electrical signals which are sent by way of conductors 120 and 118 to stationary record/reproduce circuit 34.

Figure 2:
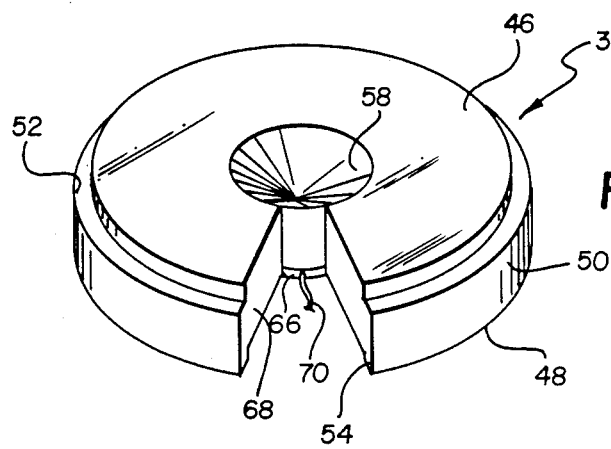
FIG. 2 is a perspective view of one embodiment of the present invention.
Figure 5:
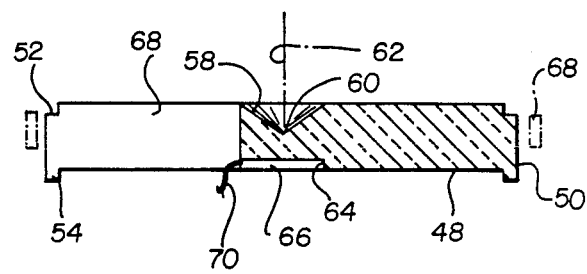
FIG. 5 is a partially sectional elevational view of the embodiment of FIG. 2 taken along lines 5—5 in FIG. 3.
Figure 3:
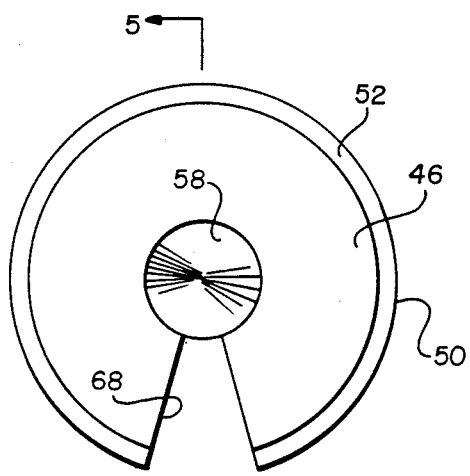
FIGS. 3 and 4 are respectively top and bottom views of the embodiment of FIG. 2.
Figure 4:
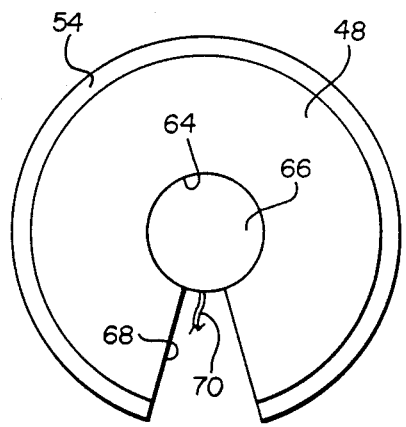

It will be understood that the signals to be transmitted to and from the magnetic heads mounted on rotating head wheel 16 may have a bandwidth or upper frequency limit of several gigahertz. The upper frequency limit is determined by the available capabilities of radiation sensitive devices and radiation emitting devices. Although the embodiment of the invention illustrated in FIG. 1 is shown as having two stacked electro-optical signal transmission modules mounted both on the head wheel and on the stationary structure of the scanner, it will be understood that any number of modules may be stacked together on both the rotating and stationary components of the scanner. Moreover, separate recording and reproducing heads may be provided on head 16, instead of heads (such as 18 and 20) which function in both a recording and reproducing mode. Although a specific construction of optical transmission modules has been described and illustrated, it will be understood that other constructions well known to those skilled in the art are contemplated by the present invention. Thus, other means for effecting stacking of like modules is contemplated by the present invention.

Where several electro-optical signal transmission modules are stacked together, the modules have sector-shaped slots which are aligned to route electrical conductors from radiation emitting and receiving devices. In such case, optical transmission of a signal may be interfered with by the optical discontinuity produced by the slots. In rotary head scanner apparatus in which magnetic tape is wrapped around the scanner with an angle of wrap of substantially less than 360°, the stationary radiation emitting devices (such as devices 68 and 88) may be angularly spaced around the rotating optical signal transmission modules. Thus, as a magnetic head is about to traverse a track on magnetic tape, the stationary radiation emitting device is activated to transmit an optical signal to the rotating head. Such a technique is incorporated in the embodiment shown in FIG. 6 and FIGS. 7A–7D. The illustrated embodiment includes four electro-optical signal transmission modules (such as shown in FIG. 2) which are stacked together on a rotating head wheel for optically transmitting four separate signals to four heads on the rotating head wheel.

Figure 6:
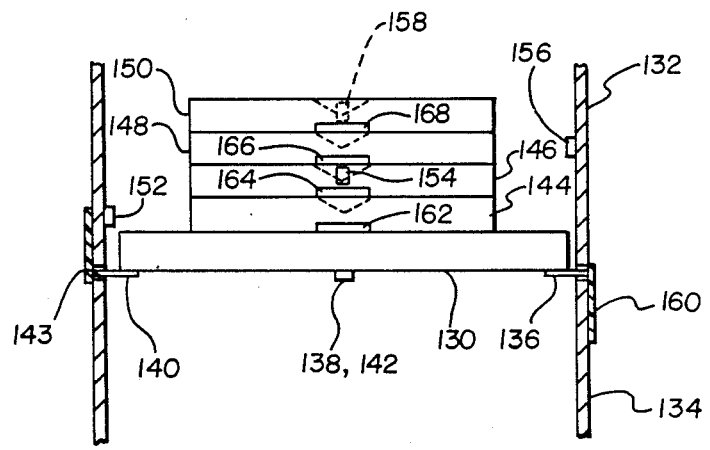
FIG. 6 is a partially sectional, elevational view of another embodiment of the invention.

As shown in FIG. 6, head wheel 130 has four magnetic heads 136, 138, 140 and 142 which extend through a slot 143 between stationary, upper and lower drums 132, 134 to record information on magnetic tape 160. Tape 160 is wrapped around drums 132 and 134 at a helical angle with an angle of wrap of approximately 180°. Mounted on head wheel 130 are a stack of electro-optical signal transmission modules 144, 146, 148 and 150 (of construction substantially the same as that of FIG. 2). Modules 144–150 have respective radiation receiving devices 162, 164, 166 and 168 centrally located on the axis of rotation of head wheel 130.

Positioned opposite modules 144, 146, 148 and 150, are respective radiation emitting devices 152, 154, 156 and 158 which are mounted on upper stationary drum 132. Devices 152-158 are angularly oriented with respect to modules 144-150 and magnetic heads 136-140, so that, when a magnetic head is in a position to record a slant track on magnetic tape 160 (as tape 160 starts to wrap around the rotary scanner), the corresponding radiation sensitive device will transmit an optical signal through a radiation transparent portion of the optical signal transmission module during the entire time that tape 160 is in contact with the magnetic head.

Figure 7A:
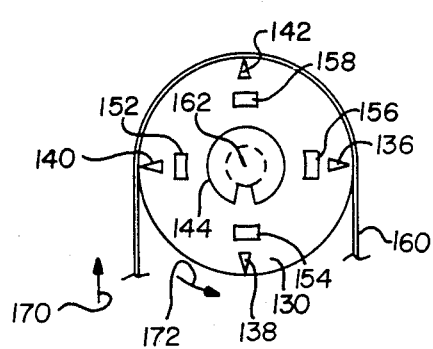
FIGS. 7A–7D are diagrammatic views illustrating the operation of the embodiment of FIG. 6.
Figure 7B:
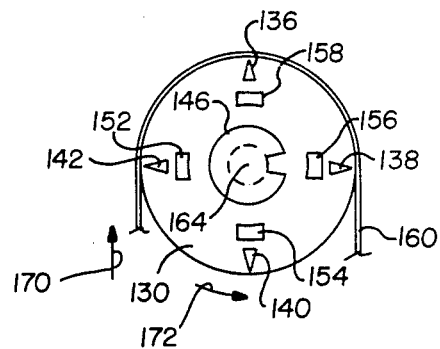
Figure 7C:
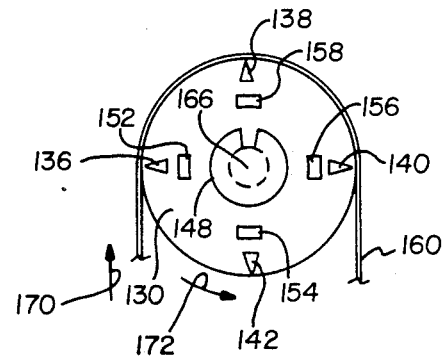
Figure 7D:
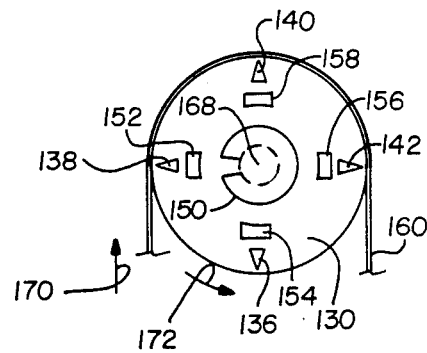

Referring to FIGS. 7A-7D there will be described the operation of the rotary head scanner of FIG. 6. As illustrated in FIG. 7A, tape 160 is traveling in the direction of arrow 170 and head wheel 130 is rotating in the direction of arrow 172. Head 136 is about to record a track on tape 160. Radiation emitting device 152 starts emitting an optical signal which is transmitted by module 144 to radiation receiving device 162. Device 162 converts the optical signal to an electrical signal supplied to head 136. In FIG. 7B, head 138 is about to record a track on tape 160 and head 136 has rotated 90° with respect to the position of FIG. 7A. In this position, optical module 152 continues to emit radiation to receiver 162 and emitting device 154 begins to transmit radiation by way of optical module 146 to receiving device 164 and thence to 138. In FIG. 7C, radiation emitting device 156 transmits radiation by way of module 148 to magnetic head 140 and in FIG. 7D, radiation emitting device 158 transmits a signal by way of module 150 to magnetic head 142.

The invention has been described in detail with reference to the Figures, however, it will be appreciated that variations and modifications are contemplated within the spirit and scope of the invention.

What is claimed is:

1. An electro-optical signal transmission module comprising:
   a generally cylindrical body having a radiation transmissive cylindrical wall and upper and lower generally circular walls;
   a radiation receiving device centrally mounted on one of said upper and lower walls;
   an inwardly directed, conically-shaped reflective surface disposed on the other of said upper and lower walls, opposite said radiation receiving device, such that an optical signal radially transmitted through said radiation transmissive wall of said body is reflected from said reflective surface onto said radiation receiving device; and
   complementary mating means respectively provided on said upper and lower walls of said body for mating a plurality of said bodies into a stack.

2. The module of claim 1 wherein said mating means comprises complementary structure on said upper and lower walls of said body.

3. The module of claim 2 wherein said complementary structure comprises an annular ridge on one of said walls and a complementary annular recess on the other of said walls.

4. The module of claim 1 wherein said radiation receiving device comprises a radiation sensitive electronic device which converts a received radiation signal into an electrical signal.

5. The module of claim 1 wherein said cylindrical body has a sector-shaped slot, extending axially between said upper and lower walls of said body, for routing electrical conductors through said slot.

6. Rotary magnetic head scanner apparatus comprising:
   a head wheel mounted for rotation about a rotational axis;
   a plurality of magnetic recording heads mounted on the periphery of said head wheel;
   a like plurality of identical optical signal transmission modules stacked together on said head wheel for rotation therewith, each of said modules transmitting a signal to a separate one of said magnetic recording heads;
   wherein each of said optical signal modules comprises (a) a generally cylindrical body having a radiation transmissive cylindrical wall and upper and lower generally circular walls; (b) a radiation sensitive recieving device centrally mounted on one of said upper and lower walls; (c) an inwardly directed, conically-shaped reflective surface disposed on the other of said upper and lower walls, opposite said receiving device, such that an optical signal radially transmitted through said radiation transmissive wall of said body is reflected from said surface onto said receiving device; and (d) complementary mating means respectively provided on said upper and lower walls of said body for mating a plurality of said modules; and wherein adjacent modules have contacting walls with complementary mating means to lock said adjacent modules together.

7. The apparatus of claim 6 wherein each of said plurality of modules has a sector-shaped slot extending axially between said upper and lower walls of said cylindrical body; wherein the slots of all of said modules are in alignment; and wherein said radiation sensitive devices of said modules have electrical conductors which are routed through said aligned slots to supply electrical signals to their respective recording heads on said head wheel.

* * * * *